(12) United States Patent
Roche et al.

(10) Patent No.: US 7,370,477 B2
(45) Date of Patent: May 13, 2008

(54) DEVICE FOR FASTENING A FLUID DUCT TO A TURBOJET CASING

(75) Inventors: Jacques André Michel Roche, Lisses (FR); Jacques Marcel Arthur Bunel, Fresnes (FR); Frederic Ruellan, Nandy (FR); Philippe Paul Marie Henry, Le Mee sur Seine (FR)

(73) Assignee: Snecma, Paris (FR)

( * ) Notice: Subject to any disclaimer, the term of this patent is extended or adjusted under 35 U.S.C. 154(b) by 361 days.

(21) Appl. No.: 11/113,101

(22) Filed: Apr. 25, 2005

(65) Prior Publication Data

US 2006/0016194 A1    Jan. 26, 2006

(30) Foreign Application Priority Data

May 5, 2004   (FR)   .................................. 04 04796

(51) Int. Cl.
*F02K 3/10*   (2006.01)

(52) U.S. Cl. ............................ 60/761; 60/740; 60/798; 285/219

(58) Field of Classification Search .................. 60/740, 60/761, 766, 796, 798; 285/20, 189, 219, 285/220, 221

See application file for complete search history.

(56) References Cited

U.S. PATENT DOCUMENTS

| 689,630 | A | * | 12/1901 | Autenrieth | .................... | 285/39 |
| 1,086,964 | A | * | 2/1914 | White | .................... | 285/219 |
| 3,879,940 | A | * | 4/1975 | Stenger et al. | .................... | 60/740 |
| 6,354,085 | B1 | | 3/2002 | Howell et al. | | |

* cited by examiner

*Primary Examiner*—L. J. Casaregola
(74) *Attorney, Agent, or Firm*—Oblon, Spivak, McClelland, Maier & Neustadt, P.C.

(57) ABSTRACT

A device for fastening a fluid duct such as a fuel duct in an orifice of a turbojet casing, the device comprising a ring screwed into the orifice of the casing and having an annular rim coming to bear against a washer at the end of the duct, and a nut screwed onto the end of the duct so as to clamp the annular rim of the ring against the washer of the duct in order to fasten the duct to the casing.

18 Claims, 3 Drawing Sheets

DEVICE FOR FASTENING A FLUID DUCT TO A TURBOJET CASING

The present invention relates to a device for fastening a fluid duct to a turbojet casing, in particular a duct for feeding fuel to a burner ring in an after-burner chamber of the turbojet.

BACKGROUND OF THE INVENTION

In conventional manner, in a bypass turbojet having an after-burner chamber, a burner ring is mounted on the radially-outer ends of flame-holder arms which are themselves secured to the outer casing of the after-burner chamber, and a circular fuel injection duct extends inside the burner ring. The circular duct is connected at a plurality of points to fuel feeds on the outer casing of the after-burner chamber via feed ducts which extend radially between the outer casing and the burner ring. These feed ducts pass through the secondary stream of the turbojet that flows between the outer casing and an internal cylindrical wall defining the after-burner chamber where the burner ring is located and having flowing therein the primary flow formed by the exhaust gas coming from the combustion chamber of the turbojet. These ducts are generally put into place and secured from inside the after-burner chamber.

It would be advantageous to house the fuel feed ducts of the burner ring inside outer end portions of the flame-holder arms in order to protect these ducts from the primary flow which is at a high temperature (that can reach about 2000°K in after-burner mode, for example) and in order to avoid disturbing the primary flow, but known means for fastening such ducts to the outer casing have parts that pass through the wall that are of relatively large diameter, so they are unsuitable for passing via the insides of the flame-holder arms.

In addition, the space available between the outer casing of the after-burner chamber and the internal cylindrical wall downstream from the burner ring is too small for it to be possible from the inside to fasten these feedthrough parts to the outer casing by using tools engaged inside the outer casing downstream from the burner ring.

OBJECTS AND SUMMARY OF THE INVENTION

An object of the present invention is to provide a solution to this problem that is simple, effective, and inexpensive.

To this end, the invention provides a device for fastening a fluid duct in an orifice of a turbojet casing, in particular a duct for feeding fuel to a burner ring in an after-burner chamber, the device comprising screw-and-nut type means between the end of the duct and the orifice of the casing, the device comprising a ring screwed into the orifice of the casing and having one end that comes to bear against abutment means fitted to the duct, and a nut screwed onto the end of the duct so as to clamp the ring against the abutment means of the duct in order to fasten it to the casing.

A priori, such a fastener device can be used for fastening the end of the duct to the casing either from outside or from inside the outer casing. When the space available inside the casing is not sufficient for handling the above-mentioned ring and nut, the ring and the nut are advantageously screwed from outside the outer casing respectively into the orifice of the casing and onto the end of the duct.

In addition, the abutment means provided on the duct are advantageously fitted thereto from outside the outer casing prior to screwing on the above-mentioned ring and nut, thus making it possible to put the duct into place from inside the casing without difficulty, and for example to cause a burner ring fuel feed duct to pass inside a flame-holder arm from the inside of the after-burner chamber.

In an embodiment of the invention, the above-mentioned abutment means comprise a washer engaged on the end of the duct and coming to bear against a shoulder of said duct.

Preferably, the washer has a central orifice that is frustoconical and engaged on a corresponding frustoconical surface of the duct.

Pressing the two frustoconical surfaces one against the other enables a leaktight connection to be formed by tightening the ring against the washer of the duct.

According to another characteristic of the invention, the nut is screwed onto the end of the duct inside the ring and has an outside diameter smaller than the inside diameter of the ring.

The clearance formed in this way between the ring and the nut avoids the end of the duct being put under stress until the end of tightening the nut.

Advantageously, the inner end of the nut comes to bear against an inner annular rim of the ring, which rim is formed at the inner end of the ring, and itself comes to bear against the washer mounted on the end of the duct.

According to another characteristic of the invention, the outer end of the ring has an outer annular rim that presses against the casing around the orifice when the ring is screwed into the orifice.

This makes it possible to define positively a final position for the ring in the orifice of the casing, and a final position for the duct in said orifice after the nut has been screwed home.

Advantageously, the threaded portion of the orifice in which the ring is screwed is itself formed by a bushing engaged in the orifice of the casing and held by axial abutment in said orifice.

This makes it possible to limit the machining operations applied to the outer casing of the turbojet, and it is easy to change the bushing in the event of its thread being damaged, instead of having to make a new thread in an orifice in the casing.

Preferably, the ring has an outside thread with a left-hand pitch and the nut has an inside thread with a right-hand pitch.

In operation, vibration can contribute to the ring and/or the nut becoming unscrewed. By having oppositely-handed threads, the extent to which one can be loosened relative to the other is limited.

In a preferred embodiment of the invention, said washer is held in a cage formed at the inner end of the ring.

This embodiment automatically ensures that the washer is correctly mounted on the end shoulder of the duct and holds the washer captive.

Advantageously, means for preventing turning are provided on the ring and the nut, e.g. comprising a safety wire engaged in corresponding end holes of the ring and the nut.

Preferably, the end of the duct has a fluid-passing axial orifice of section that is not circular, e.g. that is hexagonal, in order to receive a tool for preventing the duct from turning relative to the casing while the nut is being tightened.

This serves to prevent the duct from turning in the orifice of the casing and makes it possible to avoid the duct being under stress after the nut has been tightened.

BRIEF DESCRIPTION OF THE DRAWINGS

Other advantages and characteristics of the invention appear on reading the following description made by way of non-limiting example and with reference to the accompanying drawings, in which.

MORE DETAILED DESCRIPTION

Figure 1:
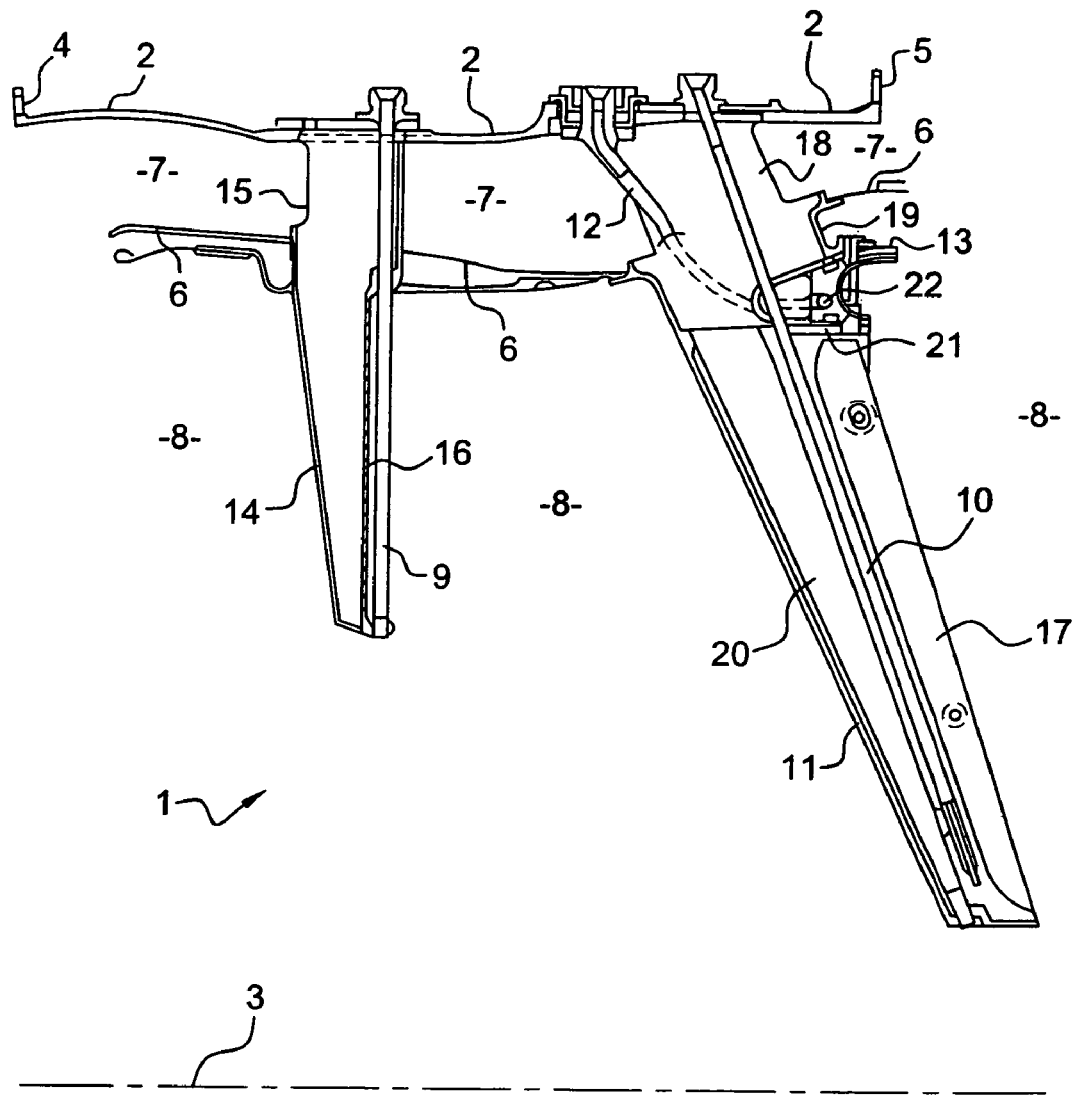
FIG. 1 is a fragmentary axial section view of an after-burner chamber of a bypass turbojet including a device of the invention for fastening a fuel feed duct of a burner ring.

Reference is made initially to FIG. 1 showing part of an after-burner chamber 1 of a bypass turbojet, the chamber being located downstream from the turbine of the turbojet.

The after-burner chamber 1 comprises a substantially cylindrical outer casing 2 of axis 3 that has an outwardly-directed annular flange 4 at its upstream end for fastening to the outer casing of the turbine, and an outwardly-directed annular flange 5 at its downstream end for fastening to an outer casing of a nozzle.

The after-burner chamber 1 includes an inner annular casing 6 coaxial with the outer casing 2.

The outer surface of the inner casing 6 and the inner surface of the outer casing 2 define an annular space 7 extending from upstream to downstream, in which there flows the cold or secondary stream of the turbojet as generated by a fan at the upstream end of the turbojet and serving to increase thrust and to ventilate components of the turbojet.

The inner casing 6 defines a cylindrical space 8 extending from upstream to downstream in which there flows the hot or primary stream of the turbojet, as constituted by the exhaust gas from the combustion chamber of the turbojet.

The after-burner chamber 1 enables the thrust of the turbojet to be increased by injecting air and fuel into the primary stream and by burning the mixture in the after-burner chamber 1.

Fuel is injected by fuel feed ducts 9 at the upstream end of the after-burner chamber 1, by fuel feed ducts 10 extending in flame-holder arms 11 downstream from the duct 9, and by fuel-feed ducts 12 for a burner ring 13 carried by the flame-holder arms 11.

The feed ducts 9 and 10 have holes for spraying fuel in a downstream direction in their radially-inner portions that extend into the primary stream.

The feed ducts 9, 10, and 12 are preferably in axial alignment relative to one another and are regularly spaced apart around the circumference of the outer casing 4. Axial alignment serves to limit turbulence in the secondary and primary streams and thus to reduce head losses. By way of example, they may be nine feed ducts 9, 10, or 12 in the after-burner chamber 1.

The feed ducts 9 are substantially perpendicular to the axis 3 and are housed in hollow V-sections 14 of angle facing upstream and extend from the inner casing 6 into the flow zone of the primary stream. The radially-outer portion of the angle of the V-section 14 that extends through the secondary stream is cut away to form an orifice 15.

In operation, a portion of the secondary stream is captured by the orifice 15 in the V-section 14 and is diverted into the primary stream via holes 16 provided in a radial wall extending upstream from the duct 9 and protecting it from the primary stream. By way of example, the temperature of the secondary stream is about 450°K while the temperature of the primary stream may lie in the range 1100° C. to 2000° C. depending on the operating speed of the turbojet. The flow of the secondary stream within the V-sections serves to cool the feed ducts 9 and the V-sections 14, and also to improve the spraying of fuel into the primary stream.

The flame-holder arms 11 extend radially around the axis 3 and obliquely relative thereto, their radially-inner ends being offset downstream, and each of them has a radially-outer portion extending through the secondary stream and a radially-inner portion extending into the primary stream.

The radially-inner portion of each arm 11 is formed by a hollow V-section whose angle faces upstream and which is closed downstream by a curved wall 17 forming a thermal protection screen for the fuel feed duct 10 which extends inside the arm 11 from the outer casing 2.

The radially-outer portion of the angle of the V-section of the arm 11 is cut open to form an opening for capturing a portion of the secondary stream, and the two side walls 18 of this portion of the V-section are secured to the outer casing 2.

The annular flow space for the secondary stream has its radial dimension reduced substantially by half downstream from the flame-holder arms 11 by an annular wall 19 mounted between the inner casing 6 and the burner ring 13, so that in operation a portion of the secondary stream flows inside each arm 11 in a ventilation box 20 extending along the feed duct 10 and upstream therefrom, the box 20 including all along its length holes that are in alignment with the feed duct 10.

The burner ring 13 is of substantially U-shaped axial section with the opening of the U-shape facing downstream, and it is mounted in the primary stream between the above-mentioned wall 19 and a downstream annular rim 21 at the end of each arm 11.

A circular fuel-feed duct 22 is mounted in the burner ring 13 and presents spray holes facing downstream, this circular duct being connected to feed ducts 12 that are substantially radial and that extend in the radially-outer portions of the arms 11, being secured to the outer casing 2 by fastener devices of the invention.

These fastener devices are put into place from the outside of the casing 2 and they do not require tools to be used in the flow zone for the secondary stream between the outer casing 2 and the inner case 6 downstream from the flame-holder arms 11.

Figure 2:
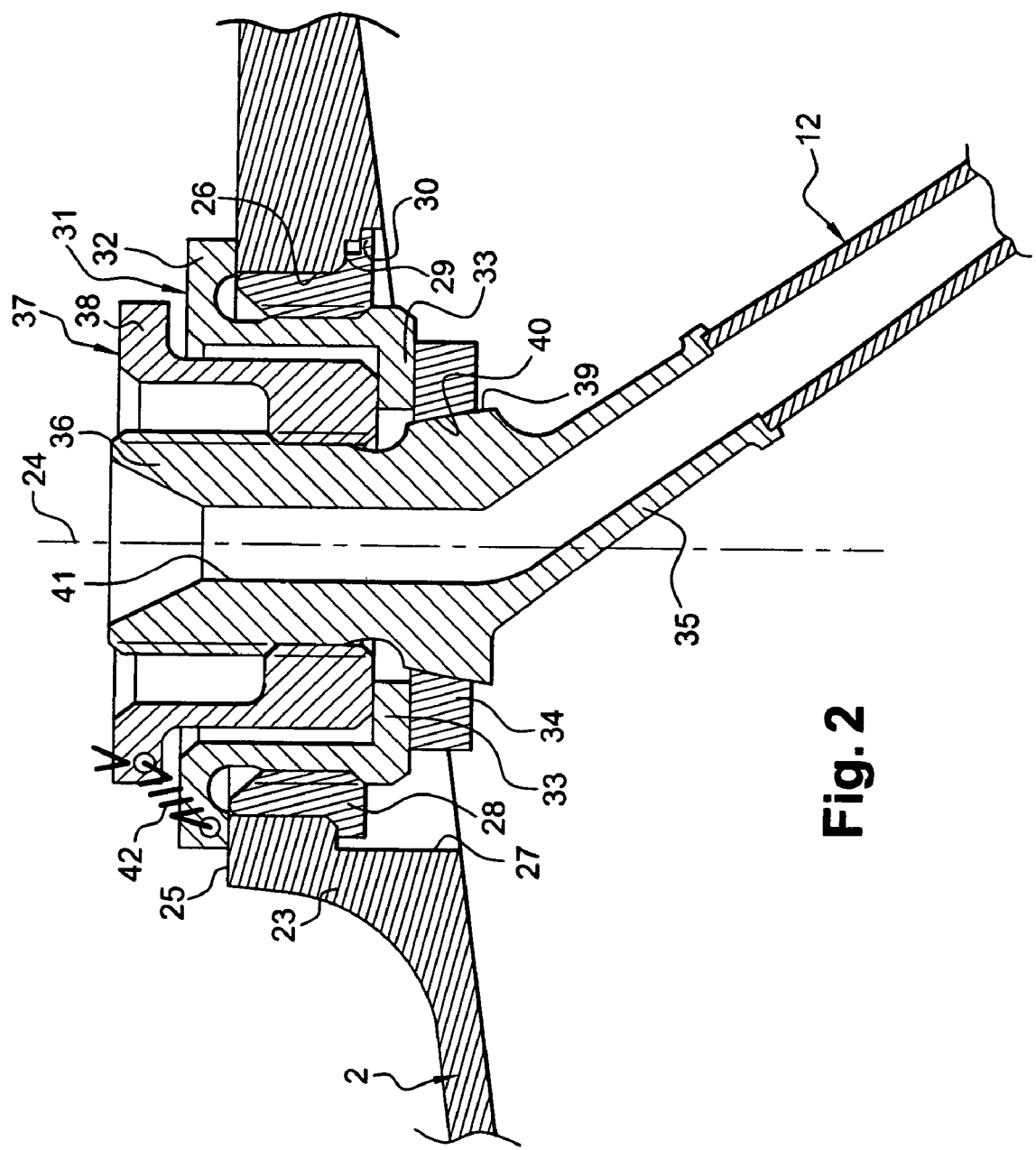
FIG. 2 is a diagrammatic view on a larger scale of FIG. 1 showing the device of the invention.

Reference is now made to FIG. 2 which is a view on a larger scale of a fastener device of the invention.

In this figure, the orifice for fastening the duct 12 to the casing is formed by a projection 23 of the casing, this projection having an axis 24 perpendicular to the axis 3 of the casing and an outside face 25 that is plane and perpendicular to the axis 24.

The orifice formed in the projection 23 has an outer portion constituted by a cylindrical bore 26 which opens out into a larger-diameter counterbore 27 extending to the inside face of the casing 2.

A cylindrical bushing 28 is fitted in the bore 26 from inside the casing and has an annular rim 29 at its inner end that bears against the end of the counterbore 27 and that includes means such as a stud 30 for preventing it from turning in the counterbore 27.

The inside cylindrical surface of the bushing 28 is threaded to receive a ring 31 whose outer end has an annular rim 32 for pressing against the outside face 25 of the projection 23, and whose inner end has an inwardly-directed annular rim 33 forming a bearing surface against a washer 34 engaged on an endpiece 35 mounted on the end of the duct 12.

In this embodiment, the endpiece 35 has a bend and it includes a straight cylindrical portion 36 with an outside thread that receives a cylindrical nut 37 whose outer end carries an outwardly-directed annular rim 38 and which has an outside diameter that, in this example, is slightly greater than the inside diameter of the ring 31.

The threaded portion 36 of the endpiece terminates in the vicinity of a frustoconical surface 39 formed on the endpiece 35 for the purpose of forming a seat for bearing against an internal frustoconical surface 40 of the washer 34, the truncated cones having their major bases on the inside and their minor bases on the outside relative to the casing 2 of the turbojet.

The outside diameter of the washer 34 is smaller than the inside diameter of the bushing 28 and greater than the inside diameter of the rim 33 of the ring 31.

The axial length of the nut 37 is determined so that in the tightened position shown in FIG. 2, its inner end bears against the edge 33 of the ring 31, which in turn bears against the washer 34 mounted on the frustoconical surface 39 of the endpiece 35 of the duct 12, the outwardly-directed rim 38 of the nut 37 then being spaced apart from the rim 32 of the ring 31.

The inside surface 41 of the threaded portion 36 of the endpiece 35 is not circular, for example it is hexagonal, so as to enable the endpiece to be prevented from rotating by means of a hex key engaged in said portion 36 of the endpiece 35.

The fastener device of the invention is mounted as follows:
  the duct 12 connected to the circular duct 22 in the burner ring 13 extends inside the outer end portion of the arm 11 and the endpiece 35 is engaged in the bore 26 of the casing 2.
  from outside the casing 2, the washer 34 is placed on the end 35 by being passed through the bushing 28 previously put into place in the bore 26. The washer 34 must be the right way round to ensure that its frustoconical surface 40 bears correctly on the frustoconical surface 39 of the endpiece 35; and
  the ring 31 is then screwed into the bushing 28, after which the nut 37 is screwed onto the threaded portion 36 of the endpiece 35. The positions at the end of screw-tightening are the positions shown in FIG. 2.

The inside diameter of the outer portion of the nut 37, which nut is not tapped along its entire length, is large enough relative to the outside diameter of the endpiece 35 to enable said endpiece to be coupled to fuel feed means that are received in part inside the nut 37.

Mounting the nut 37 to bear against the rim 33 of the ring 31, itself bearing against the washer 34 mounted on the frustoconical surface 39 of the endpiece 35, ensures that the casing 2 is fuel-tight from the outside towards the inside.

Advantageously, the threads of the ring 31 and of the nut 37 are oppositely-handed, the ring 31 having a thread with a left-hand pitch and the nut 37 having a thread with a right-hand pitch, so as to avoid them loosening relative to each other under the effect of vibration.

In addition, a safety wire 42 can be mounted as shown through holes in the rims 32 and 38 of the ring 31 and of the nut 37 so as to ensure that they do not loosen.

Holding the endpiece 35 against turning by means of a hex key engaged inside its threaded portions 36 ensures that the endpiece is not caused to turn at the end of tightening, which would stress the duct 12.

Figure 3:
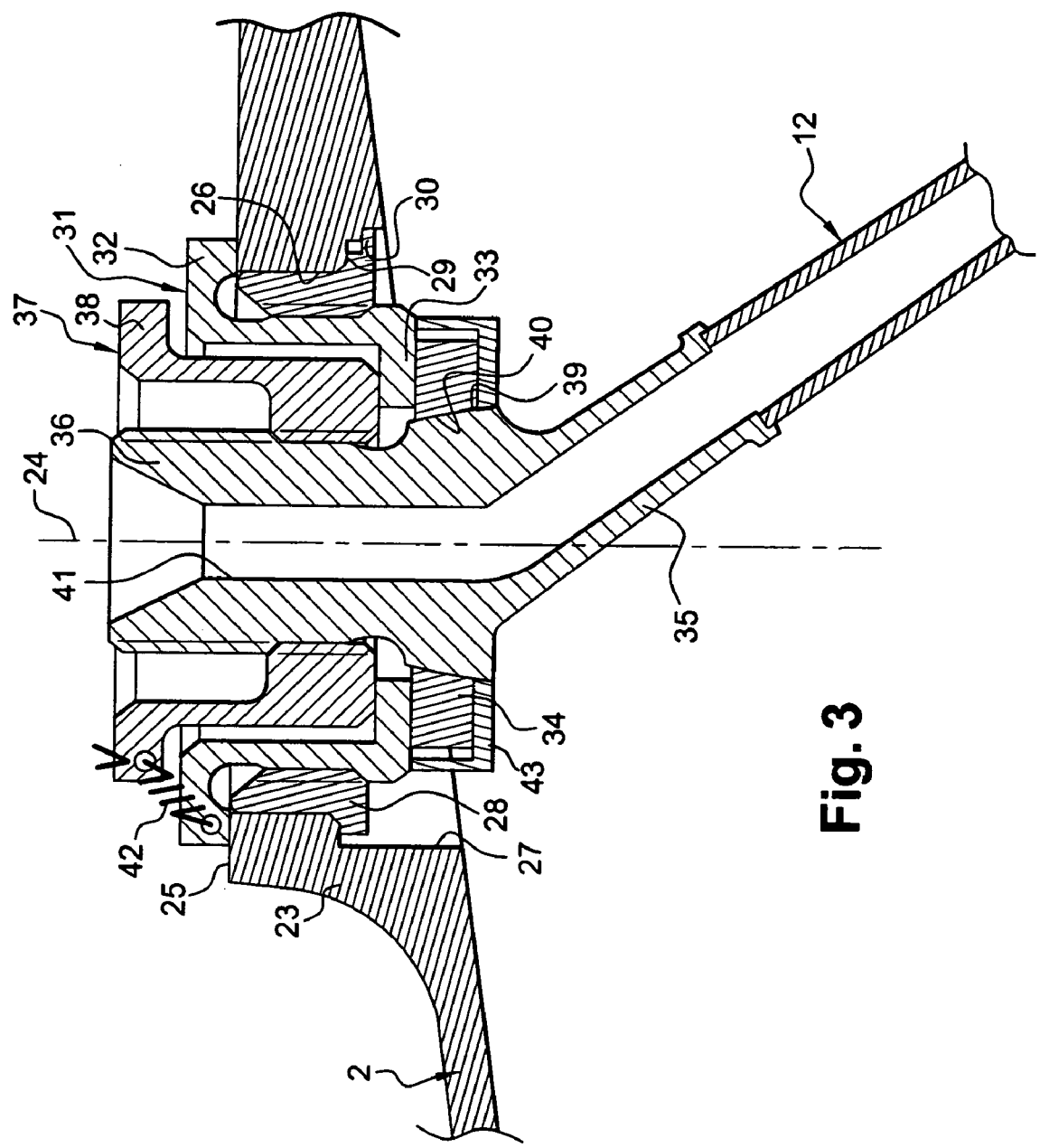
FIG. 3 is a diagrammatic axial section view of a variant embodiment of the device of the invention.

In the variant embodiment shown in FIG. 3, the washer 34 is permanently mounted in a cage formed at the inner end of the ring 31 by means of fingers 43 bent towards the axis of the ring 31, thus holding the washer captive and ensuring that it is not mounted the wrong way round on the frustoconical surface 39 of the endpiece 35.

In general, the device of the invention enables ducts 12 to be mounted simply and reliably to the casing from outside the casing, the ducts 12 being in axial alignment with the ducts 10 which extend in the flame-holder arms 11 and leading to no additional disturbance of the secondary stream.

In addition, the ducts 12 are protected from the hot primary stream by the flame-holder arms 11, and they do not create any disturbance to the primary stream.

What is claimed is:

1. A device for fastening a fluid duct in an orifice of a turbojet casing, the device comprising a ring screwed into the orifice of the casing and having one end that comes to bear against abutment means fitted to the duct, and a nut screwed onto the end of the duct so as to clamp the ring against the abutment means of the duct in order to fasten the duct, to the casing.

2. The device according to claim 1, wherein the abutment means of the duct comprise a washer engaged on the end of the duct and coming to bear on a shoulder of said duct.

3. The device according to claim 2, wherein the washer has a frustoconical central orifice engaged on a corresponding frustoconical surface of the duct.

4. The device according to claim 1, wherein said ring is screwed into the orifice of the casing from the outside of the casing and has an inner end abutted against the abutment means of the duct.

5. The device according to claim 1, wherein the nut is configured to be screwed on the end of the duct from outside the casing.

6. The device according to claim 1, wherein the nut is configured to be screwed onto the end of the duct inside the ring and has an outside diameter smaller than the inside diameter of the ring.

7. The device according to claim 1, wherein the nut has its inner end coming to bear against an inner annular rim of the ring.

8. The device according to claim 7, wherein the inner annular rim is formed at the inner end of the ring.

9. The device according to claim 1, wherein the outer end of the ring has an outwardly-directed annular rim abutted against the casing around the orifice in an installed position.

10. The device according to claim 1, wherein the threaded portion of the orifice into which the ring is screwed is formed by a bushing engaged in the orifice of the casing and held by axial abutment in said orifice.

11. The device according to claim 1, wherein the ring has an outside thread with a left-hand pitch and the nut has an inside thread with a right-hand pitch.

12. The device according to claim 2, wherein said washer is held in a cage forming the inner end of the ring.

13. The device according to claim 1, further comprising a wire engaged in corresponding end holes of the ring and the nut.

14. The device according to claim 1, wherein the end of the duct includes an axial orifice configured to pass fluid and that includes a section that is not circular, the section being configured to receive a tool configured to lock the duct relative to the casing while the nut is being tightened.

15. The device according to claim 1, wherein the nut includes a first internal bore with threading and a second internal bore without threading, and an internal diameter of the second internal bore is greater than an internal diameter of the first internal bore.

16. The device according to claim 15, wherein the duct extends within both the first internal bore and the second internal bore.

17. The device according to claim 16, wherein a gap separates the duct from a wall of the second internal bore.

18. A turbojet comprising:
- a casing including an orifice;
- a fuel-feed duct disposed in the orifice and including an external first thread;
- a nut disposed within the orifice around the fuel-feed duct and including an internal second thread mated to the first thread;
- a ring disposed within the orifice, abutting a portion of the casing, and further abutting the nut, the ring overlapping the duct in a radial direction and disposed outward of the duct in the radial direction, the ring including an external third thread;
- a threaded bushing disposed between the ring and a wall of the casing and including a fourth thread mated to the third thread;
- a washer disposed around the duct and sandwiched, in an axial direction, between the duct and the ring.

* * * * *